US008458209B2

(12) United States Patent
Clarke

(10) Patent No.: US 8,458,209 B2
(45) Date of Patent: Jun. 4, 2013

(54) VIRTUAL WORLD QUERY RESPONSE SYSTEM

(75) Inventor: Michael Paul Clarke, Ellenbrook (AU)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 12/862,004

(22) Filed: Aug. 24, 2010

(65) Prior Publication Data

US 2012/0054217 A1    Mar. 1, 2012

(51) Int. Cl.
*G06F 17/30* (2006.01)
(52) U.S. Cl.
USPC .......................................................... 707/769
(58) Field of Classification Search
None
See application file for complete search history.

(56) References Cited

U.S. PATENT DOCUMENTS

| 2003/0008712 A1* | 1/2003 | Poulin ............................. 463/42 |
| 2003/0177187 A1* | 9/2003 | Levine et al. ................. 709/205 |
| 2006/0111188 A1* | 5/2006 | Winkler ......................... 463/42 |
| 2006/0111189 A1* | 5/2006 | Winkler ......................... 463/42 |
| 2007/0083617 A1* | 4/2007 | Chakrabarti et al. ......... 709/218 |
| 2008/0222295 A1 | 9/2008 | Robinson et al. |
| 2009/0100035 A1 | 4/2009 | Cradick et al. |
| 2009/0144638 A1 | 6/2009 | Haggar et al. |
| 2009/0157853 A1 | 6/2009 | Doi |
| 2009/0199275 A1 | 8/2009 | Brock et al. |
| 2009/0251457 A1 | 10/2009 | Walker et al. |
| 2009/0262107 A1 | 10/2009 | Castelli et al. |
| 2009/0275414 A1* | 11/2009 | Lee et al. ........................ 463/42 |
| 2010/0227688 A1* | 9/2010 | Lee et al. ........................ 463/31 |
| 2011/0320411 A1* | 12/2011 | Henderson .................... 707/687 |

FOREIGN PATENT DOCUMENTS

| JP | 2000172616 A2 | 6/2000 |
| KR | 100261272 B1 | 7/2000 |

OTHER PUBLICATIONS

U.S. Appl. No. 12/862,038.
Garcia, Tiago et al., "Load Balancing for Distributed Virtual Reality Systems", URL:http://ieeexplore.ieee.org/xpl/freeabs_all.jsp?arnumber=722746, Oct. 1998 8 pages.
Morillo, Pedro et al., "Improving the Performance of Distributed Virtual Environment Systems", URL:http://www.computer.org/portal/web/csdl/doi/10.1109/TDPS.2005.83, IEEE Transactions on Parallel and Distributed Systems, vol. 16, No. 7, Jul. 2005, 13 pages.

* cited by examiner

*Primary Examiner* — Bai D. Vu
(74) *Attorney, Agent, or Firm* — Stephen R. Tkacs; Stephen J. Walder, Jr.; Libby Z. Toub

(57) ABSTRACT

The illustrative embodiments provide a computer implemented method and computer program product for a virtual world query response system. A set of virtual world entry points in a virtual world database that is responsive to a query is identified. A virtual world entry point is a location within a virtual world. A free shard from a set of free shards is identified. A shard is a virtual world hosted on a server. Custom content associated with the set of virtual world entry points is generated. The custom content is added to the selected free shard to form a custom shard responsive to the query. An entry point of the custom shard is returned to the client.

25 Claims, 7 Drawing Sheets

VIRTUAL WORLD QUERY RESPONSE SYSTEM

BACKGROUND OF THE INVENTION

1. Field of the Invention

The present invention is related generally to a data processing system and in particular to a method and computer program product for a virtual world query server. More particularly, the present invention is directed to a computer implemented method and computer usable program code for managing virtual world queries and virtual world query responses.

2. Description of the Related Art

A virtual world, also referred to as a virtual universe, metaverse, or "3D Internet", is a computer-based simulated environment hosted on a server over the Internet. Examples of virtual universes include, without limitation, Second Life™, Entropia™ Universe®, The Sims Online™, EverQuest™, Ultima Online™, Lineage™, and World of Warcraft™. Virtual worlds are typically represented using three-dimensional (3-D) graphics and landscapes.

Virtual worlds are multiuser environments. Thousands of users may populate a virtual world simultaneously. When a virtual world server becomes too busy due to the number of users accessing a virtual world hosted on the server, the virtual world server may be able to spawn a copy of that virtual world on a second server. This copy of the virtual world on the second server is referred to herein as a "shard". The virtual world server may then transfer some of the users of the virtual world to the shard on the second server. Typically the number of servers and the maximum number of shards that may be made available to users is fixed.

SUMMARY OF THE INVENTION

The illustrative embodiments provide a computer implemented method and computer program product for a virtual world query response system. In one embodiment, a set of virtual world entry points that is responsive to a virtual world query is identified in a virtual world database. A virtual world entry point is a location within a virtual world. A free shard from a set of free shards is identified. A shard is a virtual world hosted on a server. Custom content associated with the set of virtual world entry points is generated. The custom content is added to the selected free shard to form a custom shard responsive to the virtual world query. An entry point within the custom shard is returned to the client.

In another embodiment, a virtual world query is received from a client associated with an immersive virtual world environment. A shard database is searched for a custom shard having content responsive to the virtual world query. The shard database comprises an entry for each custom shard in use. The entry for the each custom shard in use comprises a description of content associated with the each custom shard and identification of a set of clients connected to the custom shard. In response to identifying the custom shard having content responsive to the virtual world query in the shard database, an entry point within the custom shard is returned to the client.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
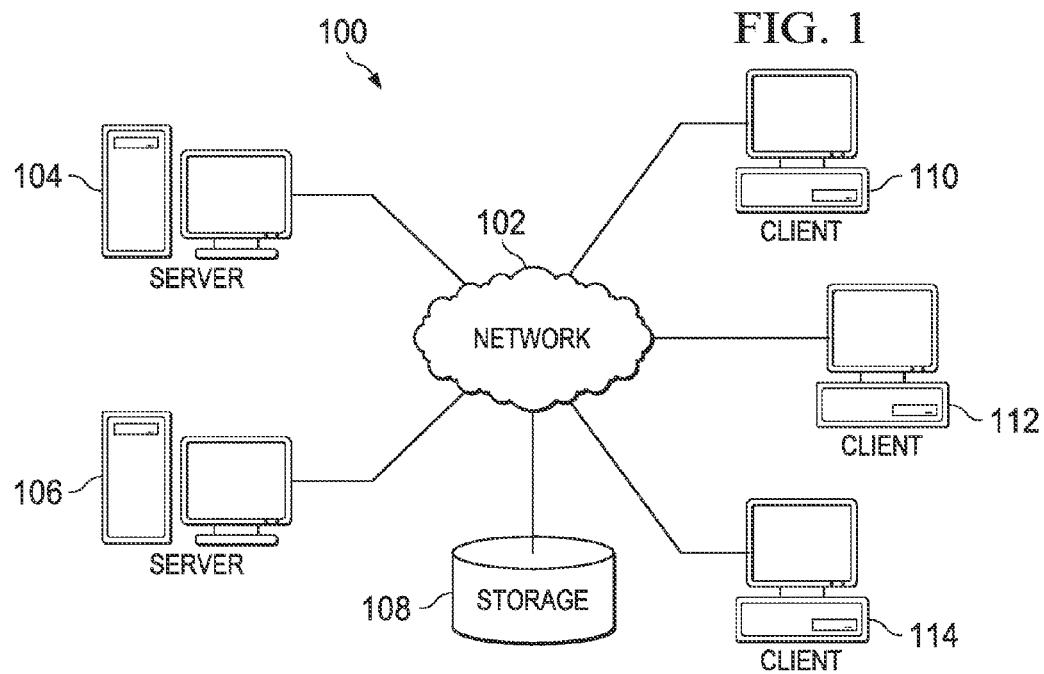
FIG. 1 is a pictorial representation of a network of data processing systems in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
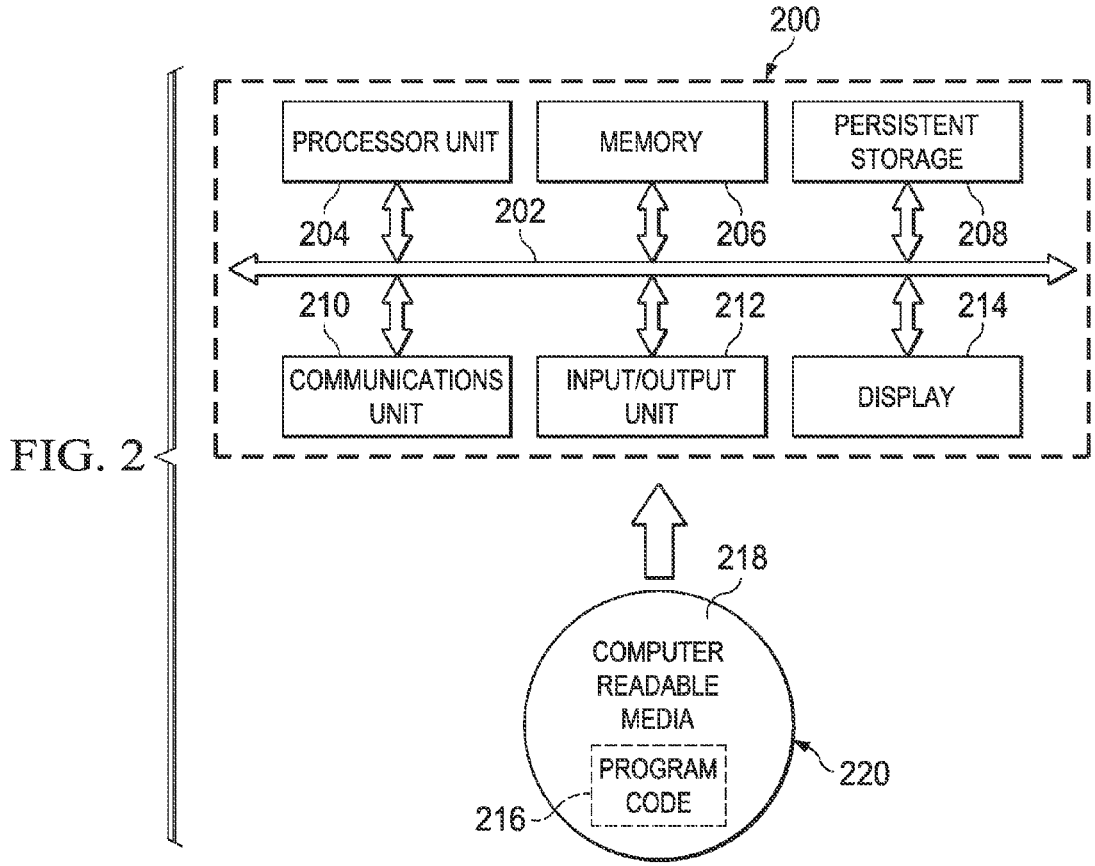
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation, and may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 may be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. The bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The embodiments recognize that when a user immersed within the environment of a first virtual world wants to navigate to a different second virtual world web site, the user leaves the immersion of the first virtual world to navigate to the second virtual world. The embodiments further recognize the problem that user(s) may be unable to identify entry points of virtual worlds and/or navigate to virtual worlds of potential interest to the user(s) without leaving the immersion of a virtual world environment.

Moreover, the user may only be able to navigate to specific virtual worlds already known to the user. The embodiments recognize that because there are currently no search engines or databases that enable the user to search for content and entry points of virtual worlds that may be of interest to the user. The embodiments also recognize the problem that users may not be able to identify and navigate to virtual world servers of potential interest to the user if the user does not already know about the virtual world content and/or address.

The embodiments further recognize the problem that users may be unable to navigate to other virtual worlds as a group within an immersive environment. The illustrative embodiments recognize that there is a need for a virtual world query server and/or a searchable database and/or index of virtual world entry points that enable a user to search and obtain entry points to virtual worlds previously unknown to the user and/or virtual worlds covering similar subject matter that may not have been known to the user.

Therefore, the illustrative embodiments provide a virtual world database that contains the addresses and/or entry points of virtual worlds. The virtual world database entries contain descriptive data that can be searched. The descriptive data is compared to the search criteria specified in the virtual world query to produce the set of matching entry points. Descriptive data may include, without limitation, at least one of a name, textual description, rating, a tag, or any other type of search parameter or search criteria.

As used herein, the term "at least one of" followed by a list of items means that different combinations of one or more of the items may be used and only one of each item in the list may be needed. For example, "at least one of item A, item B, and item C" may include, for example and without limitation, item A only, item C only, item A and item C, or item A and item B. This example may also include all of item A, item B, and item C. In one embodiment, a virtual world query server identifies a set of virtual world entry points in a virtual world database. As used herein, an entry point is a location within a virtual world. An exemplary entry point may be, without limitation, "//SLurl.com/secondlife/Here/54/105/47".

The term "set" refers to a null set having no members, as well as a set having one or more members, unless defined otherwise herein. The set of virtual world entry points is a set that may have no virtual world entry points, as well as one or more virtual world entry points that match the criteria used to search the virtual world database. If there are no virtual worlds matching the criteria the set of virtual world entry points is an empty set having no entry points in the set.

The virtual world query server selects a free shard from a set of free shards. A shard is a virtual world hosted on a server. A free shard does not contain any virtual world content. In other words, a free shard is a shard that is unallocated or empty. A free shard may be populated with virtual world content for utilization by a client. A free shard is a shard that has no clients connected to the shard and/or has no virtual world content.

The virtual world query server generates custom content associated with the set of virtual world entry points. As used herein, custom content includes, without limitation, the set of virtual world entry points that are responsive to the virtual world query and/or content that dynamically constructs a virtual world that contains a portal corresponding to each virtual world entry point in the set of virtual world entry points. A portal is a virtual world representation of an entry point.

The virtual world query server adds the custom content to the selected free shard to form a custom shard that is responsive to the virtual world query. In other words, the custom shard hosts a virtual world having portals corresponding to each entry point for each virtual world having content that is responsive to the virtual world query sent by the client. The virtual world query server returns an entry point of the custom shard to the client. The client uses the entry point to connect to the custom shard and permit a user associated with the client to interact with the virtual world associated with the customs shard.

The virtual world associated with the custom shard comprises a set of portals corresponding to each entry point in the set of virtual world entry points. Each portal leads to a location in a virtual world that is of potential interest to the user based on the virtual world query response. Thus, the user at the client may utilize the portals in the virtual world query response system hosted on the custom shard to navigate to one or more different virtual worlds of potential interest to the user from the immersion of the virtual world query response system hosted on the custom shard.

In another embodiment, a virtual world query is received from a client associated with an immersive virtual world environment. A shard database is searched for a custom shard having content responsive to the virtual world query. The shard database comprises an entry for each custom shard in use. The entry for the each custom shard in use comprises a description of content associated with the each custom shard, including the clients currently using the custom shard. The identification of clients connected to the shard permits a first user to search for a particular avatar or second user, even if the first user does not know the exact search terms used by that second user. In other words, the entry information identifying clients connected to each custom shard permits users to search by client details, such as the user's real name or the name of the user's avatar.

An avatar is a virtual world representation of a user. For example, a user might search for the virtual world for "Avatar: Fred" or search for the virtual world to which a user named "Fred Jones" is currently connected. The shard database comprises an entry for each custom shard in use.

In response to identifying the custom shard having content responsive to the virtual world query in the shard database, the entry point of the custom shard is sent to the client.

Figure 3:
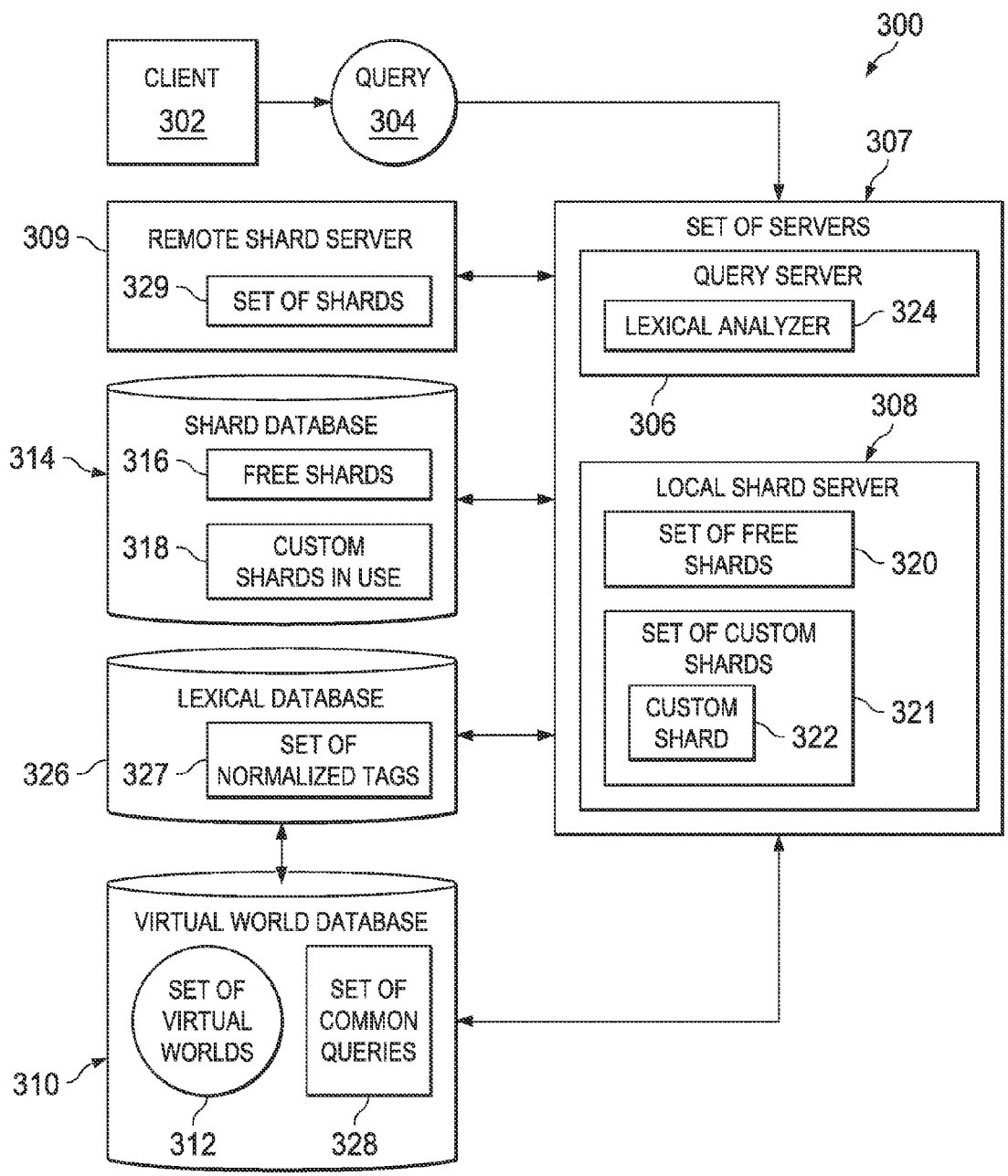
FIG. 3 is a block diagram of a virtual world query response system in accordance with an illustrative embodiment.

FIG. 3 is a block diagram of a virtual world query response system in accordance with an illustrative embodiment. Virtual world query response system 300 is a data processing system for managing virtual world queries and/or generating virtual world query responses.

Client 302 is a data processing system associated with a user. Client 302 may be implemented using any type of computing device, such as, without limitation, client 110 in FIG. 1 or data processing system 200 in FIG. 2. A user interacts with virtual world query response system 300 via client 302. In this example, but without limitation, the user may be interacting with an immersive virtual world environment displayed on client 302. The user sends query 304 to query server 306 via client 302.

Query 304 is a virtual world query requesting virtual worlds of potential interest to the client. In other words, query 304 requests information associated with virtual world(s) having content associated with key words, tags, subject matter, or other criteria specified in query 304.

Query 304 may be implemented as, without limitation, a textual string message, a uniform resource locator (URL) style string, an extended markup language (XML) style document, a pre-defined query, or any other type of query. A textual string query may be a text string containing one or more letters, numbers, symbols, terms, tags, and/or phrases. A URL style string may be any type of URL, for example, but without limitation, "server/query?t=old+masters&r1=G&rh=MA". An XML query document may contain additional information pertaining to the query, such as, but without limitation, a preference tag, a group identifier, or other information.

A pre-defined query is a query that is wholly or partially pre-generated, such as, without limitation, a canned query selected from a pre-generated set of queries. Pre-defined queries may be, without limitation, stored at client 302, on a server, or on any type of data storage device. A pre-defined query may be created by the user, by a programmer or by any other third party for utilization by the user at client 302.

The user may select one or more predefined queries from a set of predefined queries using any type of input device, such as, but without limitation, a mouse, a keyboard, a touch screen, a voice recognition system, a controller, or any other type of input device that is currently available or that may become available in the future. The set of predefined queries may include no queries, a single predefined query, as well as two or more predefined queries.

Thus, the user may generate an original query 304, select a pre-defined query from a set of queries to form query 304, combine two or more pre-defined queries to form query 304, or modify one or more pre-defined queries to form query 304.

The user may optionally generate query 304 while interacting with a virtual world at client 302. This includes queries embedded within or generated by objects within the virtual world the client is interacting with at Client 302.

Client 302 sends query 304 to query server 306 in set of servers 307. Set of servers 307 is a set of one or more servers, such as, but without limitation, query server 306 and/or local shard server 308. Set of servers 307 may contain a single query server, as well as two or more query servers. Set of servers 307 may be located on a single physical computing device. Set of servers 307 may also optionally include one or more servers located at different physical locations that are capable of sending and receiving data over a network connection. Thus, all the servers in set of servers 307 may be at the same location as query server 306. Likewise, one or more servers in set of servers 307 may be located at one or more different remote locations from query server 306.

In this embodiment, at least one server in set of servers 307 performs the role of a virtual world query server and at least one server performs the function of a shard server. Here, query server 306 is a different server than the server performing the function of shard server 308. However, the server performing the function of query server 306 may be the same server as the server performing the role of shard server 308. In yet another embodiment, a virtual machine within shard server 308 runs a query server program to perform the functions of query server 306 instead of running a custom shard program.

Query server 306 is a server that directs users to shard servers hosting virtual worlds that are responsive to their queries. The responsive shard may be an existing shard, an updated shard, or a newly constructed shard. If an existing shard having content that is responsive to a particular virtual world query does not exist, query server 306 constructs a custom shard by populating a shard with content that is responsive to query 304.

A shard server, such as, but without limitation, local shard server 308 and/or remote shard server 309, is a server hosting one or more shards. A shard server runs or controls virtual world shards hosted on the shard server. The shard server mediates interactions between users and the virtual worlds supported on the shard server.

Set of servers 307 may optionally include one or more local shard servers, such as local shard server 308. However, set of servers 307 is not required to include a local shard server at the same location as virtual world query server 306. In other words, set of servers 307 may include no local shard servers, a single local shard server, as well as two or more local shard servers. In an embodiment in which set of server 307 includes no local shard server, virtual world query server 306 may utilize one or more shard servers located remotely to virtual world query server 306, such as remote shard server 309.

Virtual world query server 306 creates and/or identifies shards that are responsive to a virtual world query using virtual world query database 310 to locate virtual world entry points responsive to the virtual world query. Virtual world query database 310 is a query database containing entries describing virtual worlds, virtual world entry points, content associated with each virtual world entry point, and content of virtual worlds.

Virtual world database 310 comprises at least one entry point for each virtual world identified in virtual world database 310. In other words, virtual world database 310 contains one or more different entry points for one or more different virtual worlds. Virtual world database 310 may contain thousands of entry points for a plurality of different virtual worlds. Each entry in virtual world database 310 for a virtual world entry point is accompanied by a description of what is found in that portion or location of the virtual world associated with the entry point.

For example, virtual world database 310 may contain an entry for a virtual world museum that mirrors the real world version of the museum. This museum virtual world may have multiple entry points such as, but without limitation, an entry point for "main entrance: a meeting place"; an entry point for "first gallery: old masters"; an entry point for "second gallery: impressionists"; an entry point for "courtyard: modern sculpture", and so forth. The virtual world database entry for the museum virtual world includes a brief description of the type of art found in each area of the museum associated with each entry point. The description may be, without limitation, a name, textual description, a tag, or any other type of description.

Query server 306 searches entries in virtual world database 310 to generate set of virtual worlds 312 responsive to query 304. A virtual world is responsive to query 304 if, without limitation, the virtual world description, content, and/or tags associated with the virtual world correspond to search terms and/or tags in query 304.

Set of virtual worlds 312 may be a null set having no virtual worlds responsive to query 304, a set with only a single responsive virtual world, or a set having two or more virtual worlds. Assuming set of virtual worlds 312 is a non-null set containing at least one virtual world entry, query server 306 selects a free shard.

Shard database 314 is a database of entries identifying all free shards and/or entries identifying custom shards in use 318. Shard database 314 may be used by a single shard server, as well as two or more shard servers. In other words, shard database 314 may be, but without limitation, updated by one or more shard servers and queried by one or more virtual world query servers, such as query server 306 as well as other query servers not shown in FIG. 3.

Free shards 316 on shard database 314 is a database listing or catalog of entries for free shards that are not currently hosting a virtual world. Free shards 316 may contain entries identifying no free shards, an entry identifying a single free shard, as well as entries identifying two or more free shards.

Query server 306 selects a free shard from set of free shard 320. Set of free shards 320 on local shard server 308 may be a null set that includes no free shards, a set having only a single free shard, as well as a set of two or more free shards. Shards in set of free shards 320 on local shard server 308 are maintained by local shard server 308 as a chain or stack rather than as an unlinked set.

Thus, when query server 306 requires a free shard, query server 306 sends a request to the shard server for a free shard. The shard server makes the next free shard at the top of the stack in set of free shards 320 available to query server 306 to form the selected free shard. In this example, the selected free shard is hosted on local shard server 308; however, the free shard may also be selected from a remote virtual world shard server, such as remote shard server 309.

Set of free shards 320 on local shard server 308 may be a null set that includes no free shards, a set having only a single free shard, as well as a set of two or more free shards. Shards in set of free shards 320 on local shard server 308 are maintained by local shard server 308 as a chain or stack rather than as an unlinked set.

In this example, if there are no free shards on local shard server 308, remote shard server 309, or any other available shard server, and query server 306 is unable to map query 304 to a shard already in use that is responsive to query 304 as discussed below, the request to query server 306 fails and no shard details are returned to client 302. In response to query server 306 selecting a free shard from set of free shards 320, query server updates free shard entries 316 in shard database 314 to reflect that the selected free shard is no longer free and/or the selected free shard has been removed from the chain of free shards in set of free shards 320.

Query server 306 creates custom content associated with set of virtual worlds 312 retrieved from virtual world database 310. Query server 306 sends the custom content to the selected free shard to form custom shard 322 in set of custom shards 321. Set of custom shards 321 may include no custom shards, a single custom shard, as well as two or more custom shards.

The selected free shard is then populated with the custom content to form custom shard 320 responsive to query 304. The shard server uses the custom content associated with set of virtual worlds 312 to dynamically construct a customized virtual world having a portal for each of the virtual world entry points returned by query server 306.

Query server 306 returns an entry point within custom shard 322 responsive to query 304 to client 302 for utilization by the user associated with client 302. The user utilizes client 302 to interact with the virtual world content hosted on custom shard 322.

Query server 306 optionally updates entries for custom shards in use 318 in shard database 314 to indicate that the selected free shard populated with the custom content to form custom shard 322 is now a custom shard in use. Entries for custom shards in use 318 may contain an entry indicating that there are currently no custom shards in use, an entry indicating that there is only a single custom shard in use, as well as entries identifying two or more custom shards in use.

Database entries for custom shards in use 318 may include information describing the contents of each custom shard in use, such as, but not limited to an identification of all clients currently connected to each custom shard in use, a subject matter identification for the custom content, a rating for the content, an identification of virtual world entry points, group identifiers, as well as any other virtual world information.

Each query server in set of servers 307 utilizing shard database 314 updates shard database 314 to identify free shards, custom shards in use, the contents of each custom shard, clients currently connected to each shard hosted on shard database 314, and/or when a shard is returned to the pool of free shard so that free shards may be obtained in an uninterruptable operation and multiple query servers do not attempt to obtain the same free shard. This prevents a situation from arising in which two different query servers attempt to populate the same shard with different information to create different custom shards.

In response to client 302 disconnecting from custom shard 322, query server removes the custom content from custom shard 322 and returns custom shard 322 to the pool of free shards. Query server 306 updates free shards 316 to show that custom shard 320 is now a free shard and/or updates custom shards in use 318 to reflect that custom shard 322 is no longer in use or available for clients to utilize. Thus, shards are recycled when the users that they were created for are done with them.

In another embodiment, when client 302 sends query 304 to query server 306, query server 306 searches custom shards in use 318 in shard database 314 to determine if a custom shard is already in use that is responsive to a query identical or equivalent to query 304. In other words, query server 306 determines whether a pre-existing matching custom shard was created for utilization by a different user that made the exact same query or a query that is equivalent to query 304. If a matching custom shard responsive to query 304 is found, query server 306 returns this matching shard to client 302 instead of generating custom content and constructing a new custom shard.

In yet another embodiment, when query server 306 receives query 304 from client 302, query server 306 searches virtual world database 310 for set of virtual worlds 312 responsive to query 304. Query server 306 then searches set of custom shards in use 318 in shard database 314 to determine whether an overlapping custom shard is in use that was constructed with the same virtual worlds as set of virtual worlds 312. In other words, query server 306 searches set of custom shards in use 318 to determine whether a pre-existing overlapping custom shard contains all of the virtual worlds in set of virtual worlds 312.

For example, given a first query for "Disney" and a second query for "Epcot", a result of the second "Epcot" query may contain virtual world entries that are a subset of the virtual world entries in the response to the first "Disney" query. In another example, a first virtual world query for "Disney World Space Centre" and Disney World Epcot" may result in identical results and/or overlapping lists of virtual world entry points responsive to the two queries.

Query server 306 may also automatically filter the queries received from clients for terms that make no significant difference to the result of the virtual world query. For example, a query containing the terms "Dallas/Fort Worth metroplex" and "Dallas & Ft. Worth" may return the same list of virtual worlds. The term "metroplex" is redundant as it does not affect the outcome of the search. The user requesting "Dallas/Fort Worth, metroplex" may be sent to the matching shard already in use for the query "Dallas & Ft. Worth" even though the queries are not exactly the same.

In another example, a first query for "theme parks" and a second query for "amusement parks" may result in the same response list of virtual worlds. Query server 306 may direct the users that made these different queries to the same custom shard rather than creating a separate custom shard for each different user.

In still another embodiment, query server 306 searches the tags and descriptions of virtual world content for each shard in set of custom shards in use 318. This is a comparison process in which query server 306 compares query 304 with the entries in set of custom shards 321 for each custom shard already in use. If query server 306 finds a match, query server 306 returns the matching custom shard already in use to client 302 rather than constructing a new custom shard for the user.

In another embodiment, query server 306 may optionally include lexical analyzer 324. Lexical analyzer 324 analyzes virtual world queries received from clients and normalizes the query to use a reduced dictionary of keywords and/or tags. A normalized query is a query that has been reduced to a set of normalized tags by lexical analyzer.

Lexical database 326 is a database of normalized tags. Lexical database 326 contains set of normalized tags 327 used within virtual world database 310. Each normalized tag in set of normalized tags 327 in lexical database 326 has a list of terms associated with that tag. For example, a normalized tag "ELVIS_PRESLEY" may be associated with a list of terms, such as, but without limitation, "elvis", "presley" "king", "pres", and so forth.

In this example, the normalization of the descriptive material in virtual world database 310 produces set of normalized tags 327 in lexical database 326. Lexical database 326 in this embodiment, but without limitation, is specific to virtual world database 310.

When query server 306 receives query 304, lexical analyzer 324 executes a lexical reduction algorithm over query 304 to normalize query 304 to a simplified subset of tags, such as set of normalized tags 327. If query 304 contains the text "Elvis in the movies", lexical analyzer 324 may analyze and reduce the query text to the normalized tag string "ELVIS_PRESLEY movies". In another example, a query such as "the king's fun houses" may be reduced to "KING ELVIS_PRESLEY fun houses". In other words, the query is normalized into two tags, the first tag is "KING" and the second tag is "ELVIS_PRESLEY". The tag "KING" is added in this example because the query terms "the king's" is not a guaranteed reference to Elvis.

In one embodiment, when a new entry point is added to virtual world database 310, information is added to virtual world database 310 for that virtual world entry point, such as, but not limited to, a name, textual description and/or a set of tags. The normalization process is applied to these textual elements to eliminate superfluous words and symbols, such as, without limit, "and", "or", "but", "a", and "the". The words that are not eliminated are mapped to normalized tags. For example, the textual description for an entry point "The Kings Hall of Fame" may be mapped to the tags "ELVIS_PRESLEY", "KING", and "HALL_OF_FAME".

If lexical analyzer 324 cannot map one or more words in the textual description for an entry point to a known normalized tag, lexical analyzer 324 prompts a user to either discard the unmapped word(s) and/or provide a normalized tag for the unmapped word(s).

For example, if lexical analyzer 324 does not recognize the words "resting place" in a textual description, lexical analyzer 324 may prompt the user to enter alternate words or discard the phrase "resting place" from the description. If the user adds the terms "grave" and "tomb", then lexical analyzer 324 may search known normalized tags for a tag associated with the words "grave" or "tomb". If a matching tag is found, that normalized tag is used. However, if a matching tag is not found, lexical analyzer 324 may create a new normalized tag "RESTING_PLACE" associated with the additional words "resting place", "grave", and "tomb" entered by the user.

In another example, if lexical analyzer 324 is unable to map word(s) in a textual description to normalized tag(s), lexical analyzer 324 may consult an electronic dictionary and/or thesaurus for additional terms and phrases associated with the unmapped word(s). Lexical analyzer 324 dynamically generates a new normalized tag based on the results of the thesaurus and/or dictionary search results.

In this embodiment, when query server 306 receives query 304, lexical analyzer 324 is run against query 304 to normalize query 304. Query server 306 searches shard database 314 using the normalized query tags to determine if a custom shard having the same tags as the normalized query is in use. If an entry is found that matches all terms of normalized query then the shard associated with the matching entry is returned to client 302 instead of creating a new customized shard. For example, if the normalized query tags are "dog" and "Cavalier", then a custom shard with the exact same "dog" and "Cavalier" tags will be a matching custom shard.

If an entry for a shard is found that is a superset of the normalized query tags, that shard is also a matching shard. For example, if the query has tags "dog" and "Cavalier", a matching virtual world entry may have a superset tags including "dog", "puppies", "Cavalier", and "King Charles Spaniel". The matching custom shard tags are a superset of the query tags having additional tags not found in the normalized query, but the tags are still a match for the tags found in the normalized query.

In this manner, query server 306 is able to more efficiently locate relevant virtual world entries and/or identify relevant custom shards responsive to a given query. Query server 306 utilizing normalized tags to search shard database 314 for matching custom shards in use may result in a net reduction in work and reduction in utilization of data processing system resources by short cutting the search and comparison algorithm.

In yet another embodiment, virtual worlds identified in virtual world database 310 are described with textual tags. In this example, virtual world database 310 contains entries identifying virtual worlds, virtual world entry points, and attributes describing the contents of the virtual world at the entry point, including, without limitation, tags describing the destination. The tags in virtual world database 310 describing a virtual world may be provided by a user, provided by an owner or creator of the virtual world, provided in a database of tags, or otherwise input into virtual world database 310 from any other source of information describing the virtual world In one example, a user provides lexical analyzer 324 with a string of textual tags that describe a virtual world. Lexical analyzer runs a lexical reduction algorithm over the string of textual tags describing each virtual world in virtual world database 310 to normalize the tags to a simplified subset of terms.

Lexical analyzer 324 may query the user for clarification or simplification of any tags that lexical analyzer 324 does not recognize Lexical analyzer 324 updates lexical database 326 associated with lexical analyzer 324 if the user provides a simplification or updated definition for a new textual tag.

Lexical analyzer 324 generates a list of normalized tags which are stored in virtual world database 310. In one embodiment, virtual world database 310 stores the list of normalized tags for a given virtual world in the virtual world database entry associated with the given virtual world.

The utilization of normalized tags in the queries and/or normalized tags describing virtual worlds in virtual world database 310 improves the likelihood that query server 306 will identify a matching custom shard already in use and/or identify relevant virtual world entries in virtual world database 310. The normalized tags also increase the number of identical and similar queries that query server 306 is able to recognize and group together in a common shard. Likewise, the normalized tags makes it easier for query server 306 to recognize multiple sets of identical and/or similar query responses.

In still another embodiment, when query server 306 receives query 304 from client 302, query server 306 obtains set of virtual worlds 312 that is responsive to query 304. In this example, rather than create a new custom shard hosting a customized virtual world responsive to query 304, query server 306 searches set of custom shards 318 in shard database 314 for a custom shard that has a threshold degree of overlap with set of virtual worlds 312 responsive to query 304. A threshold degree of overlap may be any number of virtual world entries in an existing custom shard in use that corresponds to virtual world entries in set of virtual worlds 312.

For example, and without limitation, if set of virtual worlds 312 contains five virtual world entries, a threshold degree of overlap may require that an existing custom shard in use have at least one of the five virtual world entries, at least two of the five virtual world entries, three of the five virtual world entries, or even require at least four of the five entries in set of virtual worlds 312.

In another example, the threshold degree of overlap may be, without limitation, a percentage. The threshold degree of overlap may be, without limitation, thirty percent of the responsive virtual worlds in set of virtual worlds 312, fifty percent of the responsive virtual worlds, seventy percent of the responsive virtual worlds, or any other percentage. In the example above in which set of virtual worlds 312 contains five virtual world entries, a threshold degree of overlap of fifty-percent or more overlap requires an existing custom shard have three or more of the virtual world entries found in set of virtual worlds 312 to qualify as an overlapping shard.

The overlap threshold may also be a user defined threshold selected by a user at client 302, a system administrator, or other programmer. The overlap threshold may also be a dynamic threshold that changes depending on the number of shards available, the number of users, and/or the number of queries. In still another embodiment, the overlap threshold degree of overlap is implemented as a predefined threshold.

If a custom shard contains the threshold degree or greater of overlap, query server 306 selects the overlapping custom shard and updates the overlapping custom shard to include the additional results. Query server 306 may update the overlapping custom shard to include additional results by identifying the virtual world entries that are missing from the selected shard and generating custom content associated with these missing virtual world entries to form the additional results. Query server 306 then populates the overlapping custom shard with the virtual world content for the additional results.

For example, and without limitation, if a first user sends a "London places of interest" query, the first user's custom shard generated for this first user may include virtual worlds for restaurants, museums, and zoos. If a second user sends a query for "European museums", the links for the London museums sites overlaps with some of the links for the second user's query response. Query server 306 may use the virtual world responsive to the first query as an overlapping shard. Query server 306 adds virtual world content for any virtual world links for museums missing from the first user's response to the overlapping shard responsive to the first user's query to complete the response to the second user's query. The first user's overlapping custom shard is then returned to the second user. In this way, both the first user and the second user are able to utilize the same shard due to the overlap in their query responses.

An entry point within the overlapping custom shard is then returned to second user. Other users of the overlapping custom shard are able to see the shard content change as the overlapping custom shard is updated with the additional results to the second user's query. If an overlapping shard is not found because all the pre-existing custom shards fall below the threshold degree of overlap, query server 306 generates a new custom shard responsive to the second user's query and returns an entry point within the newly generated custom shard to client 302.

In another embodiment, the recycling of custom shards that no longer have any users connected to them may be delayed, permitting them to be reused if a new query should exceed the overlap threshold. The optional delay may be set by the client, the system administrator, may be a hard coded constant, or dynamically determined based upon the demand for recycled shards.

In still another embodiment, an empty shard may be kept as a custom shard in use until a request for a free shard is received without any free shards available to respond to the request. An empty shard is a custom shard with no clients connected to the shard. If no free shard is available in this example, the oldest un-recycled empty shard is recycled and returned as the free shard in response to the request for a free shard.

In one embodiment, virtual world database 310 may optionally include a set of common queries 328. In some cases, query server 306 may be able to determine which queries are the most popular and/or determine which queries are likely to become the most popular in the near future. Set of common queries 328 is a set of the most common queries received over a given time period. For example, and without limitation, set of common queries 328 may be, but without limitation, the top ten most frequently received queries in the last twenty-four hours, the most common twenty queries received over the last eight hours, the most popular one-hundred queries received during the last two days, or any other combination of queries received over a given time period.

For each query in set of common queries 328, query server 306 identifies a custom shard in set of custom shards in use 318 corresponding to the query in set of common queries 328. If the query in set of common queries 328 is not associated with a corresponding custom shard in use that is responsive to the common query, query server 306 generates a custom shard having content responsive to the common query to form a focused shard for that common query. If a query in set of common queries 328 does have a custom shard in use, query server 306 updates the custom shard with any custom content that is necessary to complete the query responses to the common query to form a focused shard.

In one embodiment, a focused shard is generated for each query in the set of common queries. In another embodiment, the set of virtual world entry points responsive to each query in the set of common queries are analyzed to determine if there is sufficient overlap between them for the same focused shard to be utilized for two or more of the common queries. In other words two or more queries from the set of common queries may be mapped to the same focused shard if there is significant overlap between the sets of virtual world entry points responsive to both of the queries. The threshold for determining significant overlap may, without limitation, be hard coded, set by the user or administrator, or dynamically determined by the system.

Query server 306 updates shard database 314 with entries in set of custom shards in use 318 to reflect the focused shards corresponding to set of common queries 328. The focused shards, which are responsive to queries in set of common queries 328, are not recycled if there are no clients connected to them. The focused shards are only recycled when the corresponding common query associated with the focused shard ceases to be popular such that the common query is removed from set of common queries 328.

Query server 306 sends users making the same or similar query to the same shard. This enables users to travel through the search engine associated with query server 306 as a group and enables more efficient use of system resources. Query server 306 reuses custom shards to reduce the amount of resources used by query server 306 to search virtual world database 310 and construct custom shards to reduce the overhead and limit the resources of the system consumed by each client. Moreover, when clients make identical queries, more clients may be accommodated with the same number of shards. Thus, fewer servers may be used to serve greater numbers of clients.

In this embodiment, set of servers 307 may contain one or more virtual world query servers. Thus, there may be, without limitation, multiple virtual world query servers working with the same virtual world database, shard database, and/or shard servers.

In another embodiment, a free shard in set of free shards 320 may have a preference tag. A preference tag is a marker or tag associated with a shard that indicates the shard should be used with requests from one or more particular query servers, the shard should preferentially be used with one or more types of queries, or the shard should be used with one or more preferred clients or client types. The preference tag may also be implemented as a restriction prohibiting utilization of the shard by one or more identified query servers, shard servers, and/or clients.

For example, if the next free shard in set of free shards 320 has a preference tag indicating the free shard is restricted from utilization by query server 306 and/or there is a preference for utilization of the shard by a different query server, the restricted free shard is passed over and the next unrestricted free shard in the chain is utilized.

In other words, query server 306 searches down the chain of free shards in set of free shards 320 until a free shard without a preference tag identifying restriction(s) and/or preference(s) that would prevent the shard being utilized to respond to query 304 is found. In such a case, one or more restricted shards may have to be skipped over before a free shard in the chain without prohibitive restriction(s) is identified.

In still another embodiment, query 304 may include a preference tag. A preference tag indicates which shard server a user prefers to respond to a query. For example, a user may have a preference for their queries to be sent to shard servers that gave the users a good response time. In another example, a user in the United States may wish to include a preference tag in their queries indicating that the queries should only be sent to shard servers in the United States rather than a server in a different country. This geographic proximity of the shard server and the client may contribute to improved response times.

In this case, when query server 306 receives query 304, query server 306 checks for a preference tag. If a preference tag is included in query 304 indicating one or more preferred shard server(s), query server 306 searches shard database 314 for free shards, overlapping shards, or existing custom shards responsive to query 304 that are hosted on a preferred shard server(s).

In another embodiment, virtual world query response system 300 may include one or more third party shard servers owned by a different entity than the entity that owns or controls query server 306. In other words, a third party organization may provide shard server(s) that work with query server 306. In such a case, the shard server owned by the third party may be located either remotely or locally to query server 306.

Remote shard server 309 may also be a third party shard server that is part of a global resource pool. In this example, shard database 314 maintains entries for all free shards and/or custom shards in use located on all shard servers that are part of the global resource pool. When a user sends query 304 to query server 306, query server 306 searches shard database 314 for a matching shard that is responsive to query 304, an overlapping shard that may be updated to be responsive to query 304, or a free shard that may be used to generate a new custom shard responsive to query 304.

If query server 306 identifies a matching custom shard in use responsive to query 304 in set of shards 329 hosted on remote shard server 309, query server 306 sends an entry point within the matching custom shard to client 302. If query server 306 identifies an overlapping shard that may be updated with additional content to be responsive to query 304, query server 306 sends the additional content to remote shard server 309 with a directive to add the additional custom content to the overlapping shard to form an updated custom shard. Query server 306 sends an entry point within the updated custom shard to client 302.

If a custom shard or an overlapping shard is not located, query server 306 sends a directive to shard database 314 to identify a free shard. If a free shard is located on the third party server, query server 304 then directs the remote third party shard server to generate a responsive custom shard by populating the free shard with the custom content results of the query to form a new custom shard. Query server 306 sends an entry point to the new custom shard on remote shard server 309 to client 302. If there are no unrestricted free shards available and query server 306 is unable to map query 304 to a matching shard or overlapping shard, the request to query server 306 fails and no shard details are returned to client 302.

In another embodiment, query 304 may include a group identifier. A group identifier is a tag or marker identifying clients in a group of clients. When query server 306 receives query 304 accompanied by a group identifier, query server 306 searches shard database 314 for a custom shard in use associated with the group identifier. If a custom shard associated with the group identifier is found, query server 306 returns an entry point of the custom shard associated with the group identifier to the user. The group identifier permits all clients in the group to connect to the same custom shard and navigate the virtual world content associated with the custom shard as a group.

If query 304 identifies a group identifier with query 304 but does not locate a custom shard in use or an overlapping shard associated with the group identifier, query server 306 selects a free shard and generates a new custom shard responsive to query 304. Query server 304 updates an entry in shard database 314 to identify the new custom shard with the group identifier.

In this example, shard database 314 and virtual world database 310 are described as separate components. However, in another embodiment, shard database 314 and virtual world database 310 may be implemented in a single database component.

Figure 4:
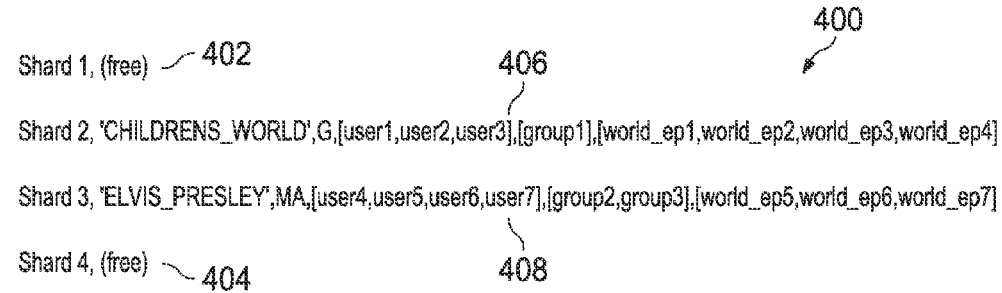
FIG. 4 is a table of entries in a shard database in accordance with an illustrative embodiment.

FIG. 4 is a table of entries in a shard database in accordance with an illustrative embodiment. Entries 400 are a set of virtual world entries in a shard database, such as, but without limitation, shard database 314 in FIG. 3.

Each entry in entries 400 contains information associated with a virtual world web site, such as, but without limitation, an address of the virtual world, subject matter of the virtual world, content of areas of the virtual world, one or more entry points of the virtual world, users connected to the virtual world, group identifiers associated with the virtual world, and/or any other information associated with a virtual world. Entries 400 in the shard database are updated to indicate changes to the information associated with a virtual world web site, such as, without limitation, changes in content of a virtual world web site and/or changes in client(s) connecting to or disconnecting from a shard currently in use.

In this example, entry 402 and entry 404 are entries identifying two free shards having no virtual world content or clients connected to the shard. Free shard entries 402 and 404 do not contain any content description or client identification.

Entry 406 identifies a custom shard populated with general audience (G) rated content. The shard database entry optionally identifies a list of user clients that are connected to the G rated custom shard, such as, but without limitation, user 1, user 2, user 3, and group 1. The client "group 1" may be a group of one or more users traversing the G rated virtual world shard content as a group. Entry 406 also identifies, but without limitation, a set of four virtual world entry points "world_ep1, world_ep2, world_ep3, and world_ep4." The four entry points may be four locations in a single virtual world or entry points for locations in two or more virtual worlds that are responsive to the query.

Entry 408 identifies, without limitation, a mature audience (MA) rated custom shard having content associated with "Elvis". Entry 408 identifies four clients connected to the shard hosting the Elvis virtual world content, two groups associated with the "Elvis" shard, and three entry points for locations within one or more virtual worlds associated with the MA rated Elvis virtual world content on the shard.

Figure 5:
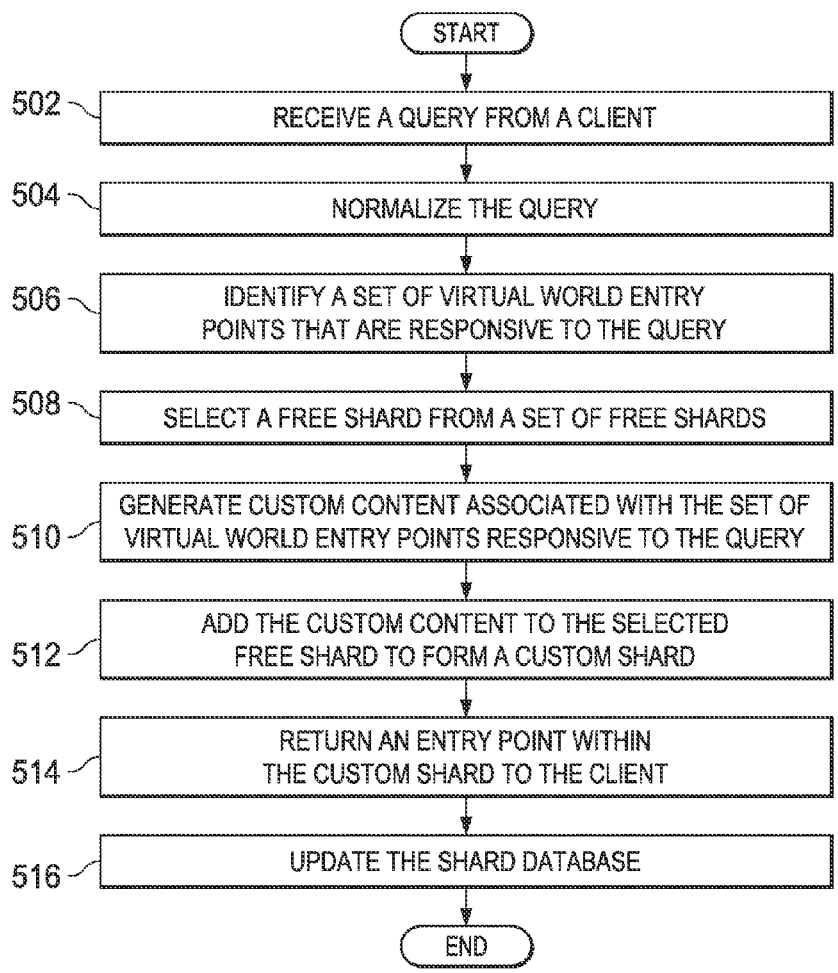
FIG. 5 is a flowchart illustrating a process for creating a customized shard in response to a virtual world query in accordance with an illustrative embodiment.

Referring now to FIG. 5, a flowchart illustrating a process for creating a customized shard in response to a virtual world query is depicted in accordance with an illustrative embodiment. The process in FIG. 5 is implemented by a server that responds to virtual world queries, such as query server 306 in FIG. 3.

The process begins by receiving a query from a client (step 502). The query is a virtual world query. The query server normalizes the query (step 504). The query server identifies a set of virtual world entry points that are responsive to the query (step 506) using a virtual world database. The query server selects a free shard from a set of free shards (step 508). The query server generates custom content associated with the set of virtual world entry points responsive to the query (step 510). The query server adds the custom content to the selected free shard to form a custom shard (step 512).

The query server returns an entry point within the custom shard to the client (step 514). The query server updates the shard database (step 516) with the process terminating thereafter.

In one embodiment, if the set of virtual world entry points responsive to the query returned at step 506 is an empty set having no responsive virtual world entry points, the process returns an indication to the user that the process has failed, such as, but without limitation, returning a "not found" code.

In another embodiment, updating the shard database at step 516 may include, without limitation, identifying the custom shard as a shard in use, identifying the custom shard as a shard that is no longer a free shard, identifying the contents of the custom shard, identifying a set of clients currently connected to the custom shard, describe the content of the custom shard, identifying the subject matter of the custom shard, identifying tags associated with the custom shard, and/or identifying any group identifiers associated with the custom shard.

In this embodiment, the query server updates the shard database at step 516. However, the update of the shard database may occur at any point from steps 508-516. For example, when a free shard is selected at step 508, the shard database may be updated to indicate that the selected free shard is no longer free and available for utilization to generate a response to a different query. Likewise, when custom content is added to the free shard, the shard database may be updated to identify and/or describe the content and subject matter being added to the shard.

Figure 6:
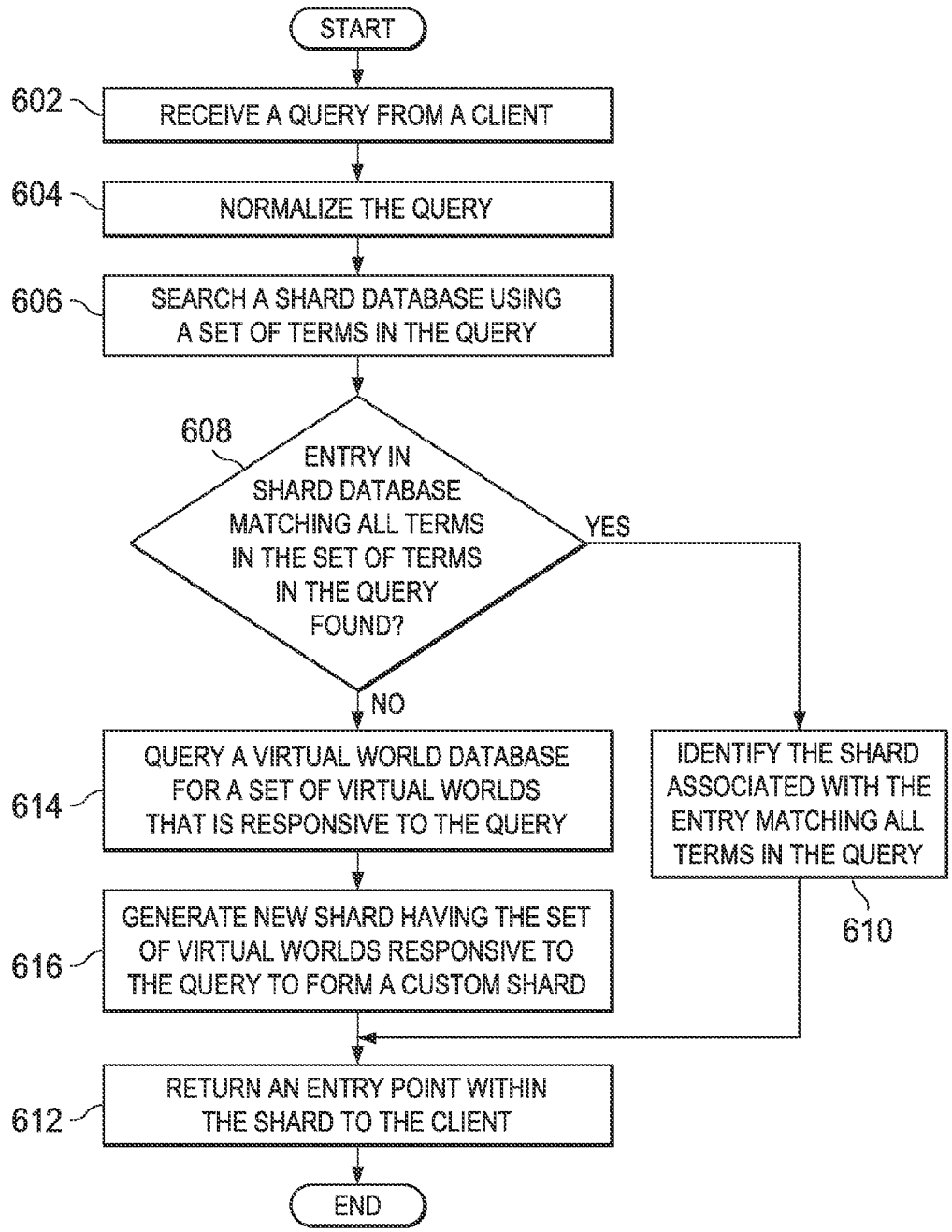
FIG. 6 is a flowchart illustrating a process for responding to virtual world queries in accordance with an illustrative embodiment.

Turning now to FIG. 6, a flowchart illustrating a process for responding to virtual world queries is shown in accordance with an illustrative embodiment. The process in FIG. 6 is implemented by a server that responds to virtual world queries, such as query server 306 in FIG. 3.

The process begins by receiving a query from a client (step 602). The query is a virtual world query. The query server normalizes the query (step 604). The query server searches a shard database using a set of terms in the query (step 606) for a custom shard matching the normalized query. The query server makes a determination as to whether an entry in the shard database matching all terms in the set of terms in the query is found (step 608). If yes, the query server identifies the shard associated with the entry matching all the terms in the query (step 610). The query server returns an entry point within the matching shard to the client (step 612) with the process terminating thereafter.

Returning now to step 608, if an entry for a matching shard is not found, the query server queries a virtual world database for a set of virtual worlds responsive to the query (step 614). The query server generates a new shard having the set of virtual worlds responsive to the query (step 616) to form a new custom shard. The query server then returns an entry point within the new shard to the client (step 612) with the process terminating thereafter.

Figure 7:
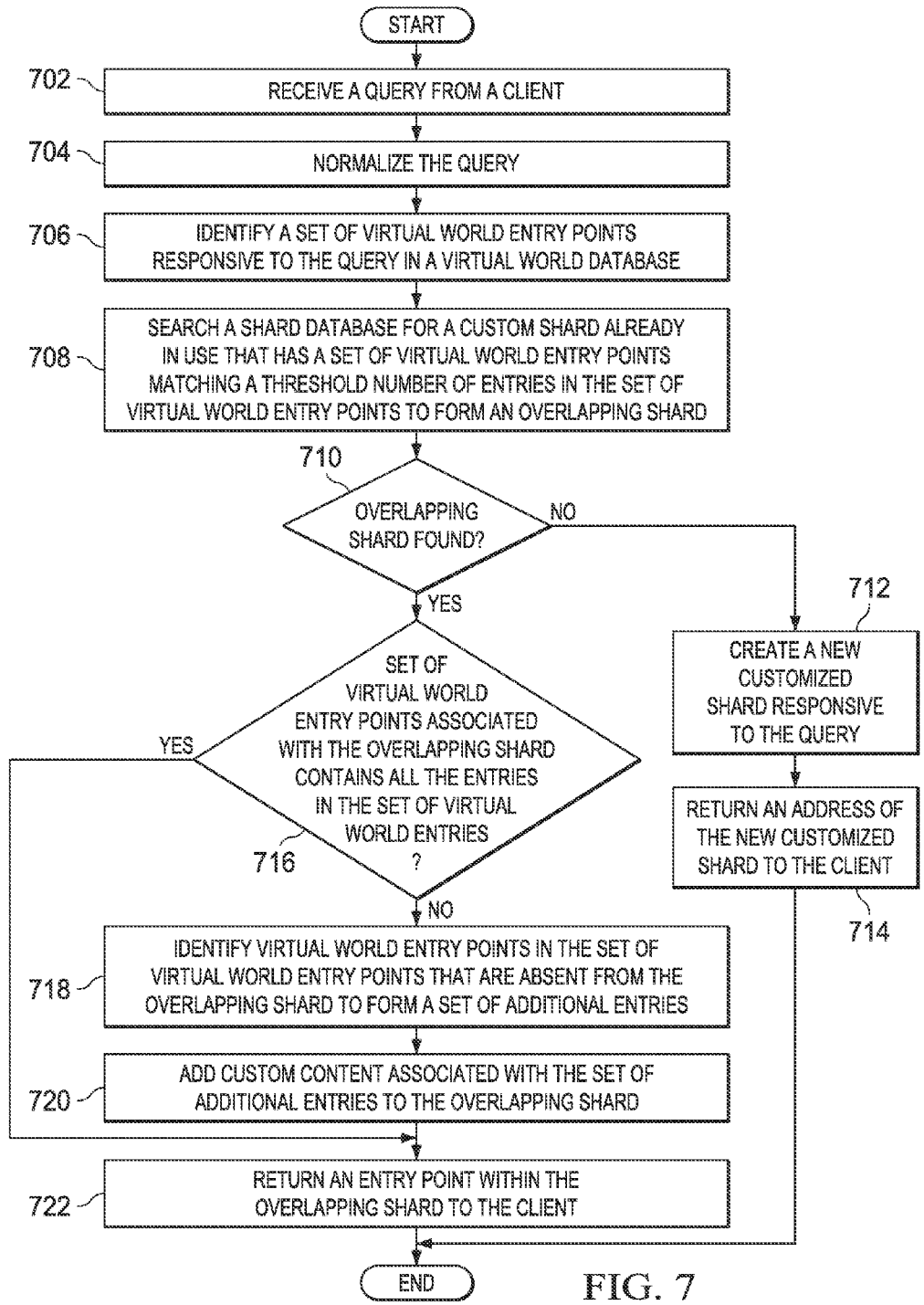
FIG. 7 is a flowchart illustrating a process for identifying an overlapping shard already in utilization in responding to a given virtual world query in accordance with an illustrative embodiment.

FIG. 7 is a flowchart illustrating a process for identifying an overlapping shard already in utilization in responding to a given query in accordance with an illustrative embodiment. The process in FIG. 7 is implemented by a server for responding to virtual world queries, such as query server 306 in FIG. 3.

The process begins by receiving a query from a client (step 702). The query is a virtual world query. The query server normalizes the query (step 704). The query server identifies a set of virtual world entry points responsive to the query in a virtual world database (step 706). The query server searches a shard database for a custom shard in use that has a set of virtual world entry points matching a threshold number of entries in the set of virtual world entry points to form an overlapping shard (step 708).

The query server makes a determination as to whether an overlapping shard is found (step 710). If no, the query server creates a new customized shard responsive to the query (step 712). The query server returns an entry point within the new customized shard to the client (step 714) with the process terminating thereafter.

Returning to step 710, if an overlapping shard is found, the query server makes a determination as to whether the set of virtual world entry points associated with the overlapping shard contains all the entries in the set of virtual world entries (step 716). If no, the process identifies virtual world entry points that are absent from the overlapping shard to form a set of additional entries (step 718). The process adds custom content associated with the set of additional entries to the overlapping shard (step 720). The process returns an entry point within the overlapping shard to the client (step 722) with the process terminating thereafter.

Returning to step 716, if the set of virtual world entry points associated with the overlapping shard contains all the entries in the set of virtual world entries, the process returns an entry point within the overlapping shard to the client (step 722) with the process terminating thereafter.

In one embodiment, an overlapping shard is identified at step 710 by searching for a custom shard already in use that has a set of virtual world entries matching a threshold number of entries in the set of virtual world entries. In another embodiment, the overlapping shard is identified by searching for a custom shard in use that has a given number of virtual world entries matching entries in the set of virtual world entries that exceeds the overlap threshold. In other words, an overlapping shard is a shard already in use that has virtual world entries matching a given number of entries in the set of virtual world entries that is equal to or greater than the overlap threshold. The overlap threshold may be a user defined threshold value, a dynamic threshold value, a user selected predefined threshold value, or a default value.

Figure 8:
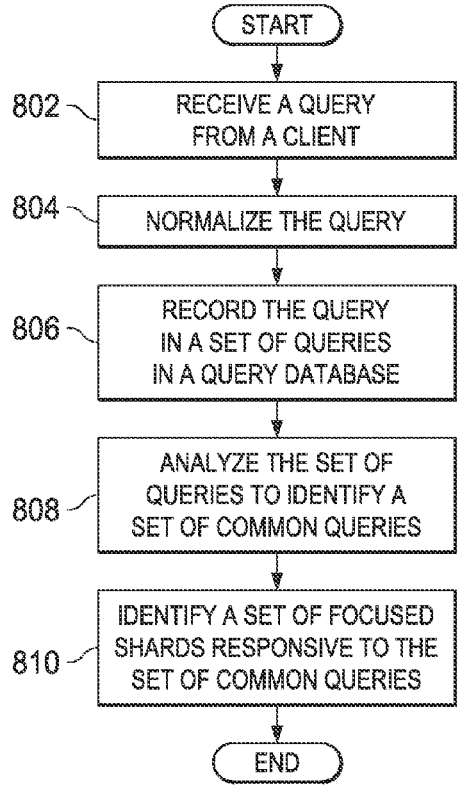
FIG. 8 is a flowchart illustrating a process for creating a set of focused shards in accordance with an illustrative embodiment.

Referring now to FIG. 8, a flowchart illustrating a process for creating a set of focused shards is shown in accordance with an illustrative embodiment. The process in FIG. 8 is implemented by a server for responding to virtual world queries, such as query server 306 in FIG. 3.

The process begins by receiving a query from a client (step 802). The query is a virtual world query. The query server normalizes the query (step 804). The query server records the query in a set of queries in a query database (step 806). The query server analyzes the set of queries to identify a set of common queries (step 808). The query server identifies a set of focused shards responsive to the set of common queries to form a set of focused shards (step 810) with the process terminating thereafter.

In one embodiment, the set of focuses shards responsive to the set of common queries comprises a virtual world shard for each query in the set of common queries. In another embodiment, a single virtual world shard in the set of focused shards may be responsive to two or more of the queries in set of common queries. In other words, a shard in the set of focused shards may be an overlapping or a matching shard having content that is responsive to two or more of the queries in the set of common queries.

In one embodiment, identifying the set of focused shards comprises identifying existing custom shards in use that are responsive to each of the common queries. In another embodiment, if the process does not identify a shard in use that is responsive to a given common query or any matching or overlapping custom shards that my be wholly or partially responsive to the common query, the process generates a new shard with content that is responsive to the common query to form a focused shard for that common query.

The process in FIG. 8 may optionally be implemented in addition to the query response system processes discussed in FIGS. 3-7 above. In other words, in one embodiment, when a query is received, the query is recorded in a query database for analysis and generation of a set of focused shards in accordance with the process in FIG. 8 in addition to responding to the query, as described in FIGS. 3-7 above.

Figure 9:
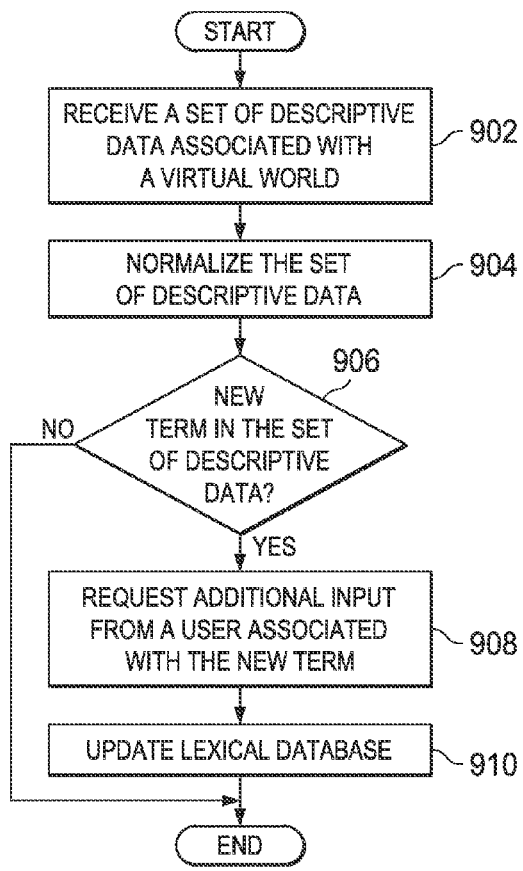
FIG. 9 is a flowchart illustrating a process for updating a lexical database in accordance with an illustrative embodiment.

FIG. 9 is a flowchart illustrating a process for updating a lexical database in accordance with an illustrative embodiment. The process in FIG. 9 is implemented by a software component for performing lexical analysis and reduction on textual tags and/or queries, such as lexical analyzer 324 in FIG. 3.

The process begins by receiving a set of descriptive data associated with a virtual world (step 902). The set of descriptive data may include, without limitation, a name, text, a textual description, and/or a set of tags. The lexical analyzer normalizes the set of descriptive data (step 904). In one embodiment, normalizing the set of descriptive data in step 904 includes mapping terms in the set of descriptive data to known normalized tags to generate a set of matching normalized tags.

The lexical analyzer makes a determination as to whether there is an unmapped new term in the set of descriptive data (step 906) that the lexical analyzer is unable to map to a known normalized tag. If no, the process terminates.

Returning to step 906, if there is a new term in the set of descriptive data, the lexical analyzer requests additional input associated with the new term from the user (step 908). The lexical analyzer updates a lexical database (step 910) with the additional input and the process terminates thereafter.

The process in FIG. 9 is implemented to update the list of normalized tags for a virtual world entry in a virtual world database. In this embodiment, the lexical database may not be updated when a new query is received and normalized, even when the query contains a set of completely unrecognized terms, words, and/or symbols. Incoming queries are normalized using known terms and known normalized tags in the lexical database associated with the virtual world database being searched.

In one embodiment, updating the lexical analyzer in step 910 comprises creating a new normalized tag based on the additional input and updating the lexical database by adding the new normalized tag to the set of normalized tags identified in the lexical database.

In another embodiment, updating the lexical analyzer in step 910 comprises updating a known normalized tag by adding some or all of the additional input. In other words, updating the lexical database may include adding additional terms to the definition of an already existing normalized tag in the lexical database.

Figure 10:
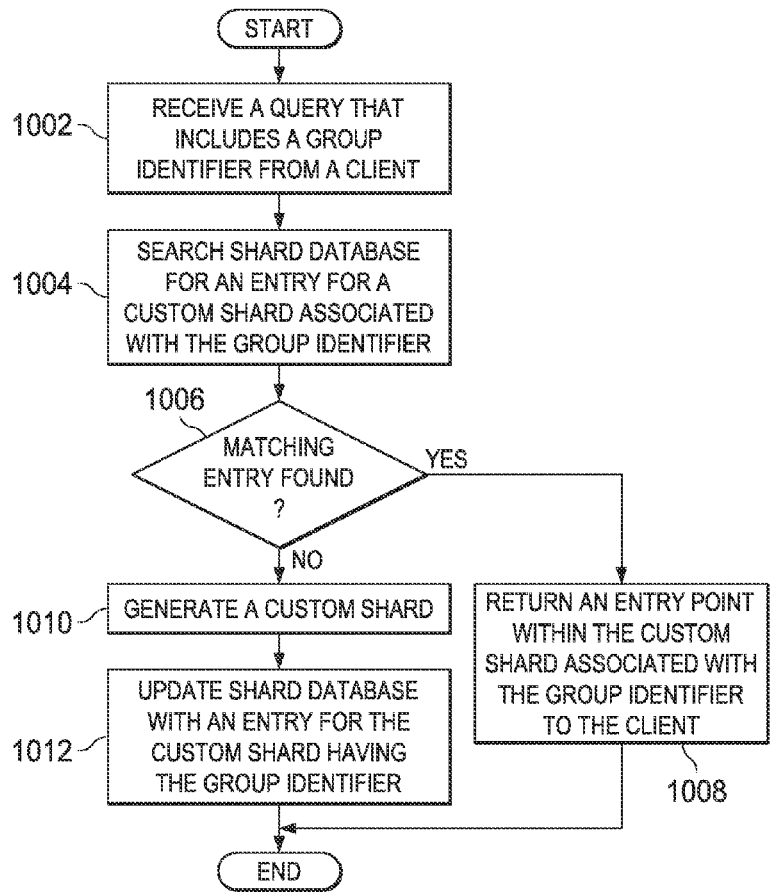
FIG. 10 is a flowchart illustrating a process for utilizing group identifiers in accordance with an illustrative embodiment.

FIG. 10 is a flowchart illustrating a process for utilizing group identifiers in accordance with an illustrative embodiment. The process in FIG. 10 is implemented by a server for responding to virtual world queries, such as query server 306 in FIG. 3.

The process begins by receiving a query that includes a group identifier (step 1002). The query is a virtual world query. The query server searches a shard database for an entry for a custom shard associated with the group identifier (step 1004). The query server makes a determination as to whether a matching entry is found (step 1006). If yes, the query server returns an entry point within the custom shard associated with the group identifier to the client (step 1008) with the process terminating thereafter.

Returning to step 1006, if a matching entry is not found, the query server generates a custom shard (step 1010) responsive to the query. The query server updates the shard database with an entry for the custom shard having the group identifier (step 1012) with the process terminating thereafter.

Figure 11:
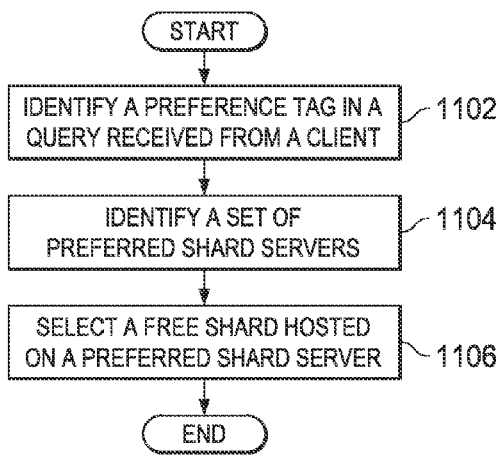
FIG. 11 is a flowchart illustrating a process for utilizing preference tags in accordance with an illustrative embodiment.

Turning now to FIG. 11, a flowchart illustrating a process for utilizing preference tags is depicted in accordance with an illustrative embodiment. The process in FIG. 11 is implemented by a server for responding to virtual world queries associated with a preference tag, such as query server 306 in FIG. 3.

The process begins by identifying a preference tag in a query received from a client (step 1102). The process identifies a set of preferred shard servers (step 1104) corresponding to the preferences indicated by the preference tag. The process selects a free shard hosted on a preferred shard server (step 1106) with the process terminating thereafter.

In this example, the preference tag in the query expresses a preference as to which shard server should be used to create a new custom shard in response to the query. This preference applies when querying the shard database to find a free shard. In one embodiment, if no free shard is found on a preferred shard server, the query may be re-driven without the preference value to obtain a free shard that could be returned to the user, even if the free shard is not a preferred shard. In another embodiment, if a preferred shard is not found, the query server returns an error notification to the client.

The illustrative embodiments provide a computer implemented method, apparatus, and computer program product for a virtual world query response system. In one embodiment, a set of virtual world entry points that is responsive to a query is identified in a virtual world database. A virtual world entry point is a location within a virtual world. A free shard from a set of free shards is identified. A shard is a virtual world hosted on a server. Custom content associated with the set of virtual world entry points is generated. The custom content is added to the selected free shard to form a custom shard responsive to the query. An entry point of the custom shard is returned to the client.

In another embodiment, a shard database is searched for a custom shard having content responsive to the query. The shard database comprises an entry for each custom shard in use or unallocated. The entry for the each custom shard in use comprises a description of content associated with the each custom shard. In response to identifying the custom shard having content responsive to the query in the shard database, the entry point of the custom shard to the client.

The virtual world query response system allows multiple users to be sent to the same shard without requiring the users to type in exactly identical queries. The virtual world query system also enables creation of a custom virtual world for a user that contains entry points to different virtual worlds containing content of potential interest to the user based on the user's virtual world query. In other words, the customized virtual world hosted on the custom shard provides portals to one or more different virtual worlds with information related to the topics or subject matter in the user's query. This enables a user to traverse different virtual worlds of interest to the user without leaving the immersion of the customized virtual world.

The query server may utilize normalized query tags and virtual world description tags to make connections between queries and virtual world entries in virtual world database that are not immediately obvious in the absence of these tags. The normalized tags further increases the number of queries that produce identical sets of results, increasing the number of users query response system can concurrently support and further reducing the requirement on users to type identical queries to end up in the same shard.

The group identifier, query tags, and virtual world tags enable the query system to group together users making the same or similar queries. Users making the same query are directed to the same virtual world. This enables users to travel through the virtual world search engine as a group. This also provides the ability for a group of users to formulate a search so the groups of users are directed to the same custom shard. Thus, the virtual world database and shard database allows the query server to combine more queries and concurrent users into the same shard. The work and resources required to search the virtual world database and construct custom shards can be reused with different clients making the same or similar queries to reduce the overhead of responding to each client query.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk, millipede storage technology, Magneto-resistive random access memory (MRAM), or phase-change memory, also known as PCM, PRAM, Ovonic Unified Memory, and Chalcogenide RAM (C-RAM). Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for a virtual world query response system, the computer implemented method comprising:
 responsive to receiving a query, identifying a set of virtual world entry points in a virtual world database that is responsive to the query, wherein a virtual world entry point is a location within a virtual world;

selecting a free shard from a set of free shards, wherein a shard is a virtual world hosted on a shard server;

generating custom content associated with the set of virtual world entry points;

adding the custom content to the selected free shard to form a custom shard responsive to the query; and returning an entry point within the custom shard to the client.

2. The computer implemented method of claim 1 further comprising:

responsive to adding the custom content to the selected free shard to form the custom shard, updating a shard database with an entry indicating that the selected free shard has been removed from the set of free shards, and wherein the shard database is updated to indicate that the custom shard is a custom shard in use; and updating the shard database with an entry identifying a set of clients connected to the custom shard.

3. The computer implemented method of claim 1 wherein the virtual world database comprises an entry for each virtual world in a plurality of virtual worlds, and wherein the entry for a given virtual world in the virtual world database identifies a set of virtual world entry points for the given virtual world, and wherein the entry for the given virtual world entry points includes at least one of a name, a textual description, and a set of tags associated with the given virtual world.

4. The computer implemented method of claim 1 further comprising:

responsive to a determination that all clients have disconnected from the custom shard for a predetermined period of time, updating a shard database to indicate that the custom shard is unavailable for utilization by clients;

removing the custom content from the custom shard to form a free shard;

returning the free shard to the set of free shards; and updating the shard database with an entry indicating that the free shard has been returned to the set of free shards.

5. The computer implemented method of claim 1 further comprising:

responsive to receiving the query, recording the query in a set of queries in a query database;

analyzing the set of queries in the query database;

identifying a set of common queries, wherein the set of common queries comprises queries received a threshold number of times over a given time period; and generating a focused shard associated with a set of queries in the set of common queries to form a focused shard, wherein the focused shard is maintained as a custom shard in use in response to all clients disconnecting from the given focused shard.

6. The computer implemented method of claim 1 further comprising:

receiving a set of descriptive data associated with a virtual world, wherein the set of descriptive data comprises at least one of a name, text, a description, or a set of tags;

mapping terms in the set of descriptive data to known normalized tags to generate a set of matching normalized tags associated with the entry point based on the set of descriptive data;

responsive to a failure to map a term in the set of descriptive data to an existing normalized tag, requesting additional input from a user associated with the unmapped term;

creating a new normalized tag based on the additional input; and updating a lexical database with the new normalized tag.

7. The computer implemented method of claim 1 wherein identifying the set of virtual world entry points further comprises:

normalizing the query by a lexical analyzer, wherein normalizing comprises reducing the query to a set of normalized query tags; and searching the database of virtual world entry points for virtual worlds having tags corresponding to the set of normalized query tags to form the set of virtual world entry points.

8. The computer implemented method of claim 1 wherein a preference tag associated with the query identifies a set of preferred shard servers, and wherein selecting the free shard from the set of free shards further comprises:

responsive to identifying a preference tag in the query identifying a set of preferred shard servers, selecting a free shard hosted on a preferred shard server in the set of preferred shard servers.

9. The computer implemented method of claim 1 wherein the selected free shard is hosted on a third party shard server.

10. The computer implemented method of claim 1 wherein the query is a first query, wherein the client is a first client, and wherein the first query is accompanied by a group identifier and further comprising:

updating a shard database with an entry indicating that the custom shard is a custom shard in use associated with the group identifier; and responsive to receiving a second query from a second client accompanied by the group identifier, returning an entry point within the custom shard to the second client, wherein the first client and the second client are members of a group of clients, and wherein all clients in the group of clients are directed to the custom shard associated with the group identifier.

11. A computer implemented method for a virtual world query response system, the computer implemented method comprising:

receiving a virtual world query from a client;

searching a shard database for a custom shard having content responsive to the query, wherein a shard is a virtual world hosted on a shard server, wherein the shard database comprises an entry for each custom shard in use, wherein the entry for the each custom shard in use comprises a description of content associated with the each custom shard and an identification of a set of clients connected to the each custom shard; and responsive to identifying the custom shard having content responsive to the query in the shard database, returning an entry point of the custom shard to the client.

12. The computer implemented method of claim 11 wherein searching a shard database for a custom shard having content responsive to the query further comprises:

searching the shard database using a first set of terms in the query;

responsive to identifying a matching entry in the shard database, returning a custom shard associated with the matching entry in the shard database to the client, wherein the matching entry comprises a second set of terms, and wherein the second set of terms comprises every term in the first set of terms in the query.

13. The computer implemented method of claim 11 wherein searching a shard database for a custom shard having content responsive to the query further comprises:

identifying a first set of virtual world entry points in a virtual world database responsive to the query, wherein the virtual world database comprises a plurality of virtual world entry points; and responsive to identifying a matching entry in the shard database, returning a custom shard associated with the matching entry in the shard database to the client, wherein the matching custom shard comprises a second set of virtual world entry points, and wherein the second set of virtual world entry points comprises every entry point in the first set of virtual world entry points.

14. The computer implemented method of claim 11 wherein searching the shard database for a custom shard having content responsive to the query, further comprises:
   identifying an overlapping custom shard, wherein the overlapping custom shard comprises a second set of virtual world entry points, wherein the second set of virtual world entries comprises a subset of the entries in the first set of virtual world entry points,
   identifying all entries in the first set of virtual world entry points that are absent from the second set of virtual world entry points to form a third set of virtual world entry points;
   generating additional custom content associated with the third set of virtual world entry points;
   adding the additional custom content to the overlapping custom shard to form an updated custom shard; and
   returning an entry point within the updated custom shard to the client.

15. The computer implemented method of claim 11 further comprising:
   responsive to a determination that the client has disconnected from the custom shard, removing the custom content from the custom shard to form a free shard;
   returning the free shard to the set of free shards; and
   updating the shard database with an entry indicating that the free shard has been returned to the set of free shards, and wherein the entry indicates that the custom shard has been removed from the set of shards in use.

16. The computer implemented method of claim 11 further comprising:
   responsive to identifying a group identifier associated with the query, searching the shard database for a custom shard associated with the group identifier, wherein the group identifier is associated with a set of clients and the custom shard; and
   returning an entry point within the custom shard associated with the group identifier to the client, wherein all clients sending queries accompanied by the group identifier are directed to the custom shard associated with the group identifier.

17. A computer program product for a virtual world query response system, the computer program product comprising:
   a computer readable storage medium having computer readable program code embodied therewith, the computer readable program code comprising:
   computer readable program code configured to identify a set of virtual world entry points in a virtual world database that is responsive to a query, wherein a virtual world entry point is a location within a virtual world;
   computer readable program code configured to select a free shard from a set of free shards, wherein a shard is a virtual world hosted on a server;
   computer readable program code configured to generate custom content associated with the set of virtual world entry points;
   computer readable program code configured to add the custom content to the selected free shard to form a custom shard responsive to the query; and
   computer readable program code configured to return an entry point of the custom shard to the client.

18. The computer program product of claim 17 further comprising:
   computer readable program code configured to record the query in a set of queries in a query database in response to receiving the query;
   computer readable program code configured to analyze the set of queries in the query database;
   computer readable program code configured to identify a set of common queries, wherein the set of common queries comprises queries received a threshold number of times over a given time period; and
   computer readable program code configured to generate a focused shard associated with a query in the set of common queries to form a focused shard, wherein the focused shard is maintained as a custom shard in use in response to all clients disconnecting from the given focused shard.

19. The computer program product of claim 17 further comprising:
   computer readable program code configured to select a free shard hosted on a preferred shard server in a set of preferred shard servers in response to identifying a preference tag in the query identifying a set of preferred shard servers.

20. The computer program product of claim 17 further comprising:
   computer readable program code configured to update a shard database with an entry indicating that the custom shard is a custom shard in use associated with the group identifier; wherein the query is a first query, wherein the client is a first client, and wherein the first query is accompanied by a group identifier; and
   computer readable program code configured to return the entry point of the custom shard to the second client in response to receiving a second query from a second client accompanied by the group identifier, wherein the first client and the second client are members of a group of clients, and wherein all clients in the group of clients are directed to the custom shard associated with the group identifier.

21. The computer program product of claim 17 further comprising:
   computer readable program code configured to reduce the query to a set of normalized query tags to form a normalized query; and
   computer readable program code configured to search the database of virtual world entry points for virtual worlds having tags corresponding to the set of normalized query tags to form the set of virtual world entry points.

22. An apparatus, comprising:
   a processor; and
   a memory couple to the processor, wherein the memory comprises instructions which, when executed by the processor, cause the processor to:
   responsive to receiving a query, identify a set of virtual world entry points in a virtual world database that is responsive to the query, wherein a virtual world entry point is a location within a virtual world;
   select a free shard from a set of free shards, wherein a shard is a virtual world hosted on a shard server;
   generate custom content associated with the set of virtual world entry points;
   add the custom content to the selected free shard to form a custom shard responsive to the query; and
   return an entry point within the custom shard to the client.

23. The apparatus of claim 22 wherein the instructions further cause the processor to:

record the query in a set of queries in a query database in response to receiving the query;
analyze the set of queries in the query database;
identify a set of common queries, wherein the set of common queries comprises queries received a threshold number of times over a given period; and
generate a focused shard associated with a query in the set of common queries to form a focused shard, wherein the focused shard is maintained as a custom shard in use in response to all clients disconnecting from the given focused shard.

24. The apparatus of claim 22 wherein the instructions further cause the processor to:
select a free share hosted on a preferred shard server in a set of preferred shard servers in response to identifying a preference tag in the query identifying a set of preferred shard servers.

25. The apparatus of claim 22 wherein the instructions further cause the processor to:
update a shard database with an entry indicating that the custom shard is a custom shard in use associated with the group identifier; wherein the query is a first query, wherein the client is a first client, and wherein the first query is accompanied by a group identifier; and
return the entry point of the custom shard to the second client in response to receiving a second query from a second client accompanied by the group identifier, wherein the first client and the second client are members of a group of clients, and wherein all clients in the group of clients are directed to the custom shard associated with the group identifier.

* * * * *